United States Patent [19]

Arai et al.

[11] 4,298,895
[45] Nov. 3, 1981

[54] VISUAL IMAGE NOISE ELIMINATING SYSTEM

[75] Inventors: Yoshio Arai; Hiroyuki Kataoka; Isao Suzuki; Shozo Yokota, all of Ebina, Japan

[73] Assignee: Fuji Xerox Co., Ltd., Tokyo, Japan

[21] Appl. No.: 71,417

[22] Filed: Aug. 30, 1979

[30] Foreign Application Priority Data

Aug. 31, 1978 [JP] Japan ............................ 53-105621

[51] Int. Cl.$^3$ .......................... H04N 1/40; H04N 5/31
[52] U.S. Cl. ................................ 358/284; 358/167; 364/515
[58] Field of Search ................ 358/167, 36, 280, 282, 358/284, 283; 364/515

[56] References Cited

U.S. PATENT DOCUMENTS

| | | | |
|---|---|---|---|
| 3,443,026 | 5/1969 | Townsend | 358/282 |
| 3,472,958 | 10/1969 | Estock | 358/282 |
| 3,652,791 | 3/1972 | Shuey | 358/282 |
| 4,196,453 | 4/1980 | Warren | 358/284 |
| 4,196,454 | 4/1980 | Warren | 358/284 |

*Primary Examiner*—Robert L. Griffin
*Assistant Examiner*—Edward L. Coles

[57] ABSTRACT

Method and apparatus for eliminating noise in a digitally recorded visual image wherein the proportion of picture elements in an area surrounding an objective area having a first visual level or component is determined and the objective area concluded as having the same visual level or component when the proportion is above a predetermined value. In one embodiment, both picture elements in the surrounding and objective areas are counted to determine the proportion while in another only those picture elements in the surrounding area are counted.

7 Claims, 6 Drawing Figures

VISUAL IMAGE NOISE ELIMINATING SYSTEM

BACKGROUND OF THE INVENTION

The invention relates to a system for eliminating noise produced while recording an image on a recording medium and, more particularly, to a noise eliminating system utilized in apparatus for scanning an original document image to convert it into binary electric signals corresponding to plural parallel scan lines and for recording the image on a sheet of paper or for displaying it on a CRT.

It has been proposed previously to scan an original document image in order to convert it into a series of electric image signals and to re-order the image signals so as to provide a converted or coded image different from the original document image to reduce the amount of stored data for easy transport and storage. In reproducing such a converted image, the converted image should be converted into electric signals in the same phase relationship as at the time of scanning the original document image in order to properly reproduce a converted image corresponding to the original document image. A poorly coordinated phase relationship will cause noise in the reproduced image and degrade the image quality. As the amount of phase distortion increases, such noise becomes correspondingly greater until eventually the converted image cannot be reproduced. In order to provide a good phase relationship, it has been proposed to record reference marks on the converted image simultaneously with the conversion of the original document image. However, this fails to fully eliminate the noise problem. Accordingly, there is a need for a noise elimination system which is capable of attaining a higher quality reproduced image.

SUMMARY OF THE INVENTION

Therefore, it is an object of the present invention to provide a novel noise elimination system particularly useful for eliminating noises in thin-line or "hair" shapes which tend to be generated upon reproduction of converted images.

These, as well as the other objects of the invention, are met by a method for eliminating noise and a system for recording a visual image on a recording media in accordance with binary electrical image signals produced corresponding to each of a plurality of scanning lines including the steps of counting one level of two levels of the binary electrical image signals corresponding to the picture elements in a surrounding area around at least a part of an objective area including at least one picture element therein and producing an image signal representing the at least one picture element in the objective area as the chosen level if the counted value of picture elements exceeds a predetermined level and representing it as the other level when the percentage of the counted value is less than the predetermined value. The levels may, for example, be black and white areas, respectively, of the image to be stored and reproduced. In a first embodiment in accordance with the invention, solely the picture elements in the surrounding elements are counted to determine the percentage level. In another embodiment, both the picture elements in the surrounding area and in the objective area are counted.

Still further, in accordance with the objectives of the invention, a device for eliminating noise upon recording a visual image upon a recording medium can be provided including the combination of a first buffer memory for storing therein data representing a visual image comprising data points representing visual points of the image in an objective area and in an area surrounding the objective area, a second memory for storing data from which noise has been eliminated, and a noise eliminating circuit means for transferring data from the first memory to the second memory wherein the noise eliminating means includes means for counting picture elements having a first visual component and means for producing data points representing such elements in the objective area having the first visual component when the proportion of such elements in the surrounding area having the first visual component exceeds a predetermined level with the data points thus produced stored at positions in the second memory corresponding to picture elements in the objective area. As in the preferred methods in accordance with the teachings of the present invention, in one embodiment, only picture elements in the surrounding area are counted while in second embodiment picture elements in both the surrounding area and in the objective area are counted.

DESCRIPTION OF THE PREFERRED EMBODIMENTS

Figure 1:
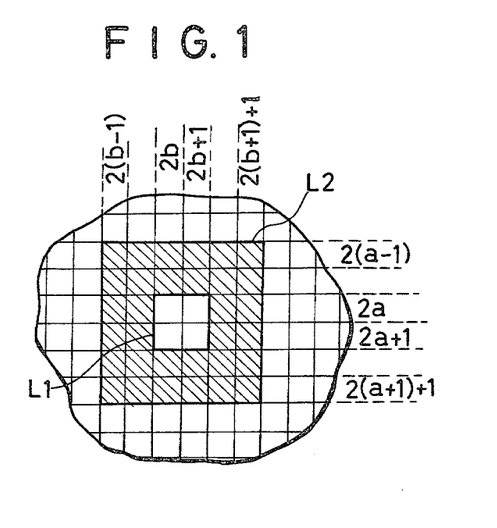
FIG. 1 is a diagram used in explaining the principles of the present invention.

FIG. 1 is a view used to explain the principles of the present invention in which there is illustrated a picture element arrangement. In FIG. 1, the areas surrounded by thin lines in the rectangular grid are termed picture elements, the area surrounded by thick lines L1 is termed an objective area in which noise elimination is to be accomplished, and the area hatched and lying between thick lines L1 and L2 is termed a surrounding area. In the example shown, the objective area includes 2×2 picture elements and the surrounding area includes 6×6−2×2 picture elements. It is to be noted, of course, that any desired number of picture elements may be included in the objective area and the surrounding area as long as the surrounding area does in fact surround the objective area.

Noise elimination may be effected by counting the number of white picture elements among the 32 picture elements included in the surrounding area (or the 36 picture elements included in the surrounding and objective areas) and concluding that the 4 picture elements in the objective area are white when the number of white elements is more than a predetermined level (for example 90 percent) and concluding that they are black or remain as they are when the number is less than the predetermined level. Another technique is to conclude that the picture elements in the objective area are white when the proportion of white picture elements of the picture elements included in the surrounding area or in the surrounding and objective areas is more than a predetermined level (for example, 80 percent) and to conclude that the picture elements in the objective area are black when the number is less than the predetermined level and that they should remain as is when the number is between the predetermined levels. Thus, the noise appearing on the reproduced image can be eliminated in the above manner by making conclusions based upon all of the picture elements constituting the image.

A circuit can be constructed utilizing the above-described technique for eliminating noise with respect to an image composed of $2m \times 2n$ picture elements under an assumption that the objective area includes $2 \times 2$ picture elements existing on lines $2b$ and $2b+1$ and on scanning lines $2a$ and $2a+1$ and the surrounding area includes 32 picture elements existing on lines from $2(b-1)$ to $2(b+1)+1$ and on scanning lines $2(a-1)$ to $2(a+1)+1$.

Figure 2:
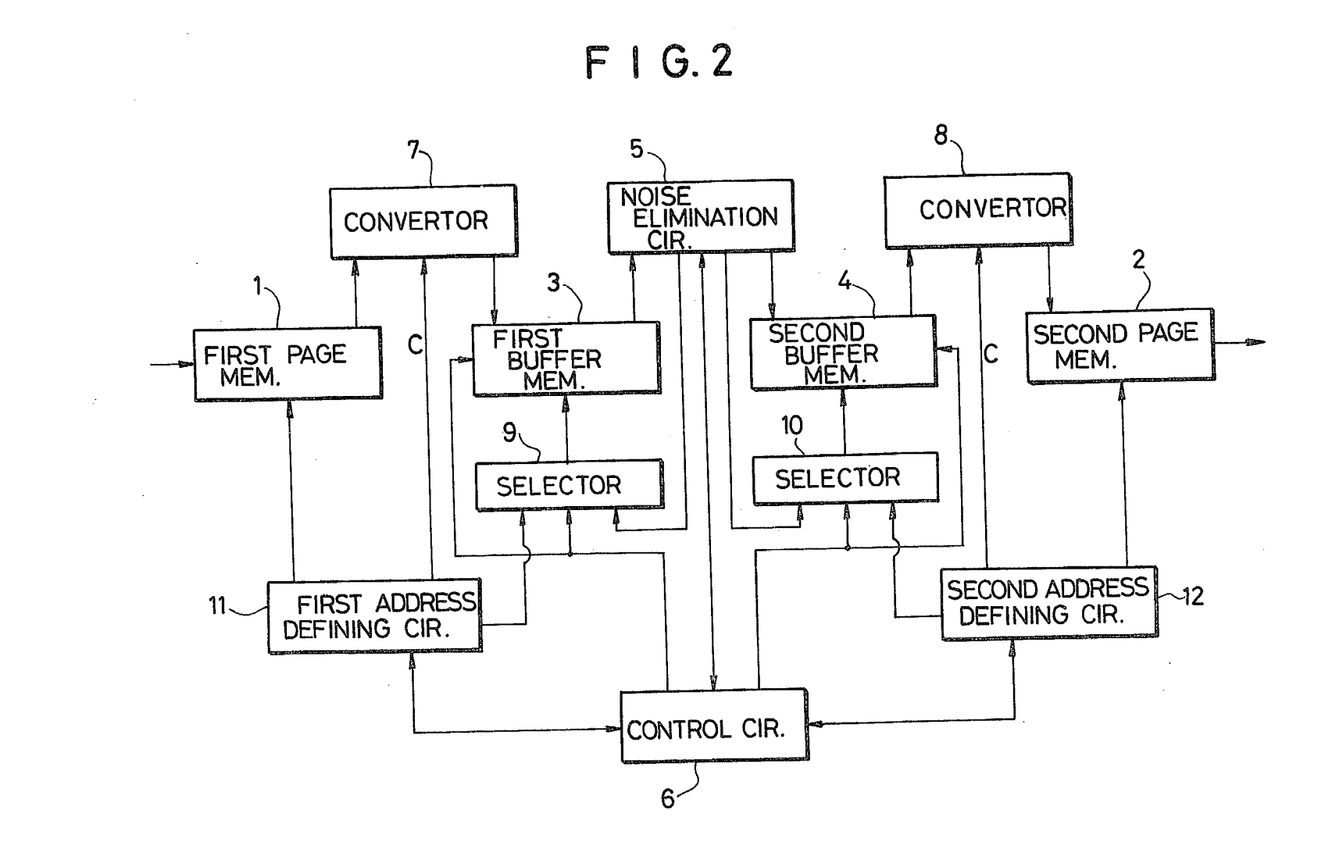
FIG. 2 is a block diagram showing a first embodiment of the present invention.

FIG. 2 is a block diagram showing such circuit means comprising a $2m$ by $2n$ bit memory 1 (hereinafter referred to as a first page memory) for storing image data corresponding to one page of an original document represented by electric binary signals obtained by scanning the original document image. The data is written into and read out of the page memory for every several bits. Data is assumed herein to be transferred by every P bits. It is also assumed herein that the image data upon which noise elimination is to be performed has been stored in the page memory 1 by suitable means (not shown). Designated at 2 is a memory means (hereinafter referred to as a second page memory) having a $2m$ by $2n$ bit capacity equal to that of the first page memory 1 for storing data obtained by suitable means in a manner to be described. Data is read into and read out of the second page memory 2 every P bits. Reference numeral 3 designates a $2n$ by 6 bit buffer memory for storing data transferred from the first page memory 1 which corresponds to six scanning lines, numeral 4 a $2n$ by 2 bit buffer memory for storing the image data corresponding to two scanning lines, numeral 5 a noise elimination circuit for eliminating noise on two lines of the six lines stored in the first buffer memory 3 and for transferring the resulting data to the second buffer memory 4, numeral 7 a series-to-parallel converter circuit for converting the P bit data read from the first page memory 1 into a single bit stream and for transferring it to the first buffer memory 1, numeral 8 a series-to-parallel converter circuit for receiving the single bit data read from the second buffer memory 4 and for transferring in parallel P bits of data to the second pate memory 2, numeral 11 a first address generating circuit for addressing the first page memory 1 and the first buffer memory 3 when the data is transferred from the first page memory 1 to the buffer memory 3, numeral 12 a second address generating circuit for addressing the second buffer memory 4 and the second page memory 2 when data is transferred from the second buffer memory 4 to the second page memory 2, numerals 9 and 10 first and second selectors for selecting means for addressing the first and second buffer memories 3 and 4, and numeral 6 designates a control circuit for controlling the operations of the above-described elements.

First, second and third steps are repeated a desired number of times to eliminate noise. That is, noise elimination is effected with respect to the picture elements on two contiguous scanning lines by first, second and third steps. The respective steps will be described with an assumption that the contiguous two scanning lines are $2a$ and $2a+1$ lines (where $a=1, 2, \ldots, m-2$).

In the first step, data corresponding to the six scanning lines $2(a-1)$ to $2(a+1)+1$ and stored in the first page memory 1 is transferred to the first buffer memory 3. The data read from the first page memory 1 is converted from P bits into a single bit stream by the series-to-parallel converter circuit 7 and subsequently stored in the first buffer memory 3.

In the second step, the data stored in the first buffer memory 3 and corresponding to the six picture elements on lines $2(b-1)$ to $2(b+1)$ (where $b=1, 2, \ldots, n-1$) and lines $2(a-1)$ to $2(a+1)+1$ is sequentially read out by the noise elimination circuit 5 and a decision or conclusion as to the actual state of the data relating to the $2 \times 2$ picture elements on lines $2b$ and $2b+1$ and on scanning lines $2a$ and $2a+1$ (included in the objective area) is made in accordance with the $6 \times 6 - 2 \times 2$ data points from the surrounding area. The data is then stored in addresses $2b$, $2b+1$, $2n+2b$, and $2n+2b+1$ of the second buffer memory 4 (which will be described in more detail below). When such an operation is effected for $n-2$ objective areas, the noise elimination operation for scanning lines $2a$ and $2a+1$ is completed.

In the third step, the data stored in the second buffer memory 4 and corresponding to scanning lines $2a$ and $2a+1$ is transferred to the page memory 2.

By repeating the first, second and third steps $m-2$ times from $a=1$ to $a=m-2$, image data from which noise has been eliminated is stored in the second page memory 2. Means for reading out the data from the page memory 2 and transferring it to the recording means is well-known in the art and will not described herein. In this case, noise elimination is not effected with respect to picture elements on scanning lines 0, 1, 2, $m-1$, $2m-1$ and picture elements on scanning lines 0, 1, $2(n-1)$, and $2n-1$ and either of white and black is always recorded. Since no information exists in the edge portion of the image, there is no problem in practice. If desired, for such edge portions, data having the same content as that of the first page memory may be transferred to the second page memory.

Figure 3:
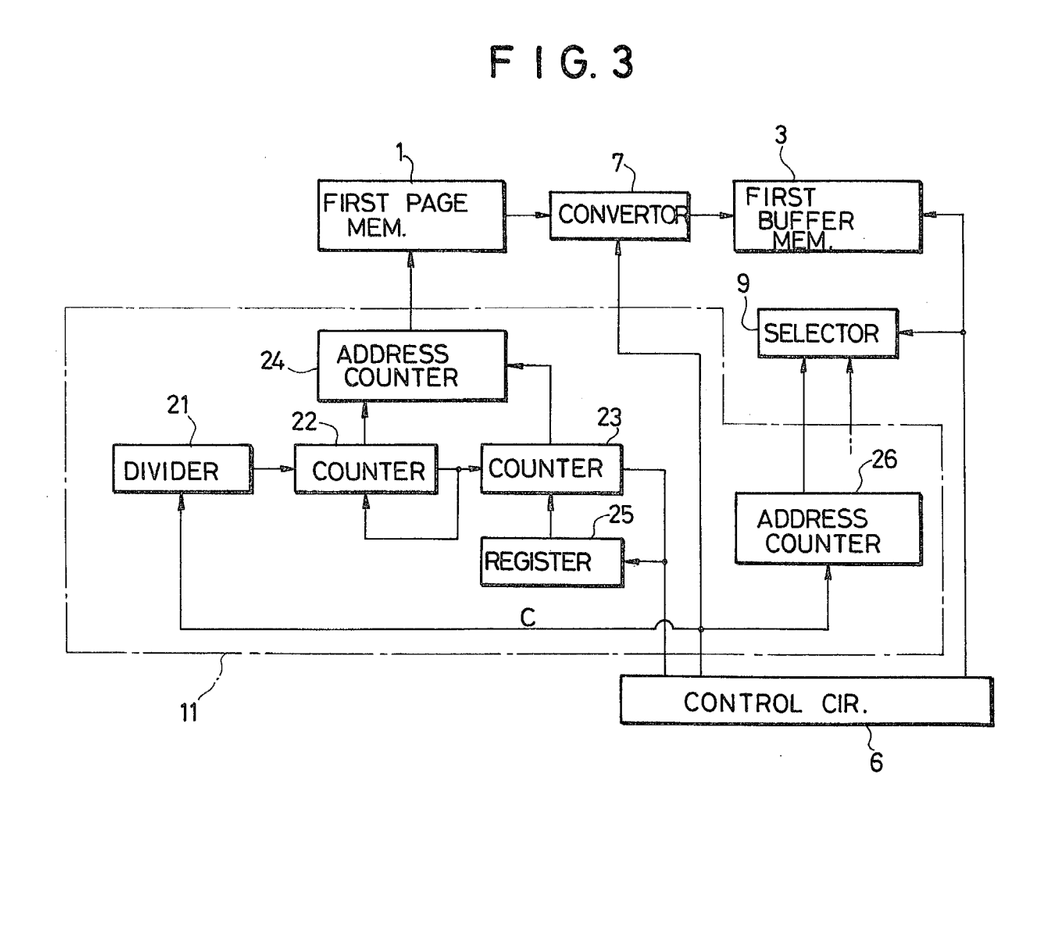
FIGS. 3 and 6 are block diagrams showing in detail first and second address defining circuits, respectively.

FIG. 3 is a block diagram showing an example of the first address generating circuit 11. At the start of the first step, the control circuit 6 renders the first buffer memory 3 readable and activates the first selector 9 such that the address counter 26 generates an address which is coupled to the buffer memory 3. Simultaneously, the control circuit 6 sends clock pulse C to a P divider 21, an address counter 26 and the series-to-parallel converter circuit 7. The output of the P divider 21 is supplied to a counter 22 which counts the clock pulses produced by the divider 21 to generate an address which is coupled to the first page memory 1 corresponding to the P picture elements on the scanning lines 0 to $q-1$ (where q is a natural number satisfying $pq=2n$). The counter 22 produces a pulse each time q pulses from 0 to $q-1$ are supplied thereto. The pulses which are produced are applied to a counter 23 and the counter 22 is reset. The counter 23 counts these pulses to generate an address corresponding to the respective scanning lines which is coupled to an address counter 24. The address counter 24 specifies an address for the P picture elements to be transferred from the address defined by the counters 22 and 23. The address counter 26 specifies the result which is coupled as an address to the first buffer memory 3 each time a clock pulse C is supplied thereto corresponding to the address coupled to the first buffer memory 3 upon transferring the data to the first buffer memory 3. The counter 23 adds two to the value stored in a register 25 and applies the result as an initial value each time it counts six pulses received from the counter 22 while simultaneously providing a signal to the control circuit 6 indicating that data corresponding to six scanning lines has been completely transferred. The control circuit 6 is responsive to the signal for stopping the clock pulses to the P divider 21, the address counter 26 and the series-parallel converter circuit 7. In such a manner, the first buffer memory 3 stores the data corresponding to the six scanning lines $2a-2$ to $2b+3$.

Figure 4:
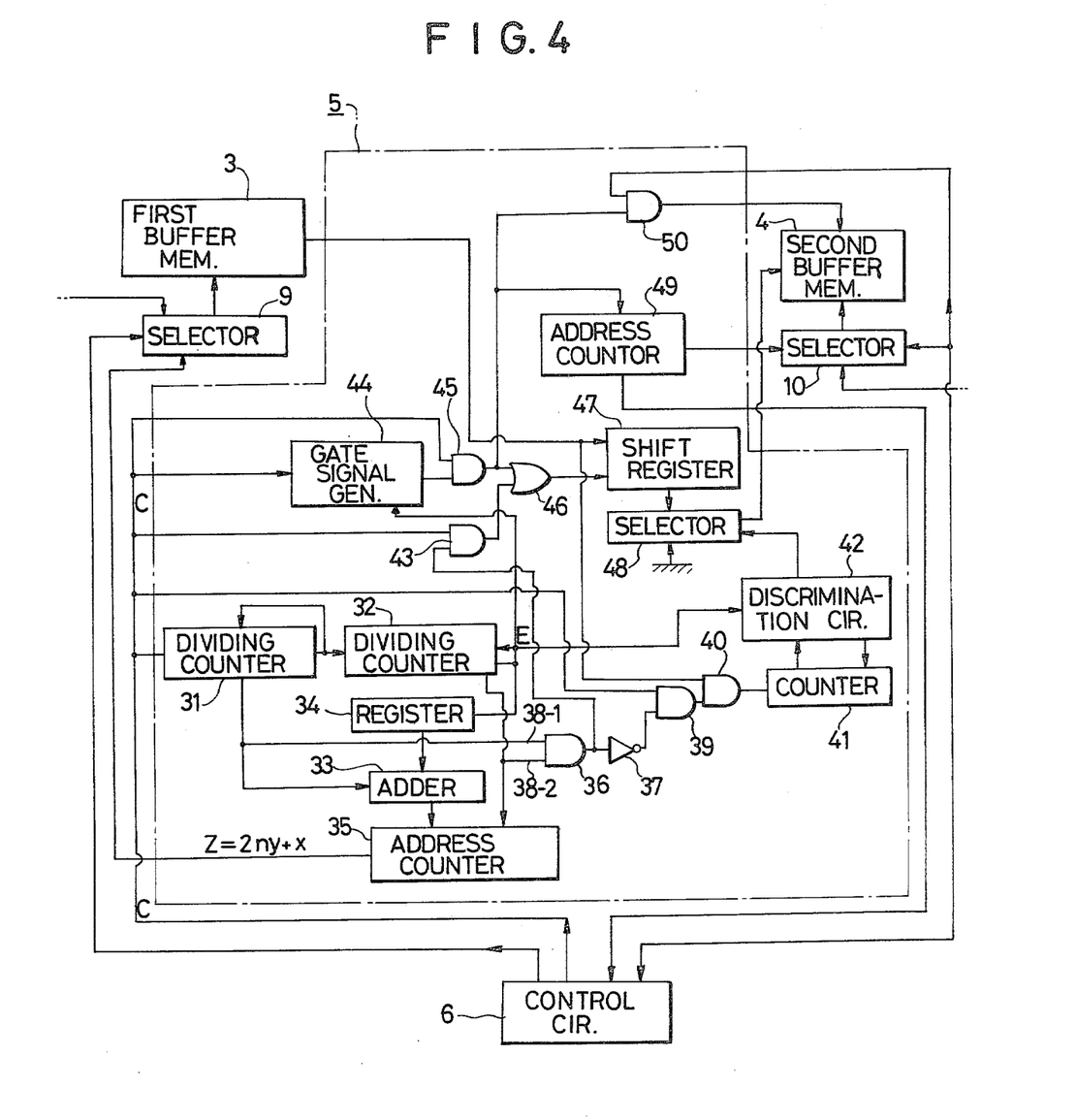
FIG. 4 is a block diagram showing in detail a noise elimination circuit.

FIG. 4 is a block diagram showing in detail a preferred embodiment of the noise elimination circuit 5. In the second step, address counters 35 and 49 generate respective addresses which are coupled to the buffer memories 3 and 4. This operation is effected by the control circuit 6 in conjunction with the selectors 9 and 10. The control circuit 6 also opens a gate 50 so as to make it possible to write data into the second buffer memory 4. The first buffer memory 3 is assumed to have stored therein in the first step $2n \times 6$ bit data corresponding to six scanning lines $2(a-1)$ to $2(a+1)+1$ in order from address 0 to address $2n \times 6$. The address generated upon reading out the data from the buffer memory 3 is produced by the address counter 35. The address counter is responsive to the outputs x and y (where $x=0$ to $2n-1$ and $y=0, 1, 2, \ldots, 5$) from the adder 33 and a 1/6 dividing counter 32 for computing the required address $z = 2n \times y + x$.

At the start of the second step, the 1/6 dividing counter 31 counts the clock pulses produced by the control circuit 6 and couples the output count, which is a value of zero to five to the adder 33 each time a clock pulse C is applied thereto and supplies a pulse to the 1/6 dividing counter 32 each time a count of six is reached. The counter 31 is also reset each time a count of six is reached. Like the counter 31, the counter 32 supplies the output count of zero to five to the address counter 35 and also produces a pulse and is reset each time a count of six is reached. As will be described below, the presence of the output pulse from counter 32 indicates that the data corresponding to $6 \times 6$ picture elements in the objective and surrounding areas has been completely read out. The output count value produced by the dividing counter 31 is supplied to the adder 33 together with the value stored in the register 34. The resulting sum is supplied to the address counter 35 as value x. The register 34 has a value of zero stored therein at the start of the second step and thereafter adds two to the stored value each time the dividing counter 32 produces a pulse.

Figure 5:
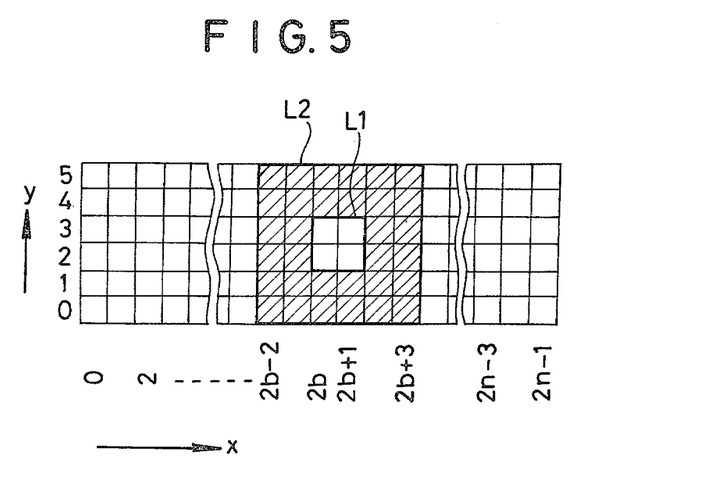
FIG. 5 is a schematic view showing a first buffer memory.

Addresses generated by the address counter 35 will be described with reference to FIG. 5 which diagrammatically shows addresses of the first buffer memory 3 in correspondence with scanning lines and picture elements on the scanning lines. The two values coupled to the address counter 35 are in correspondence with each other. That is, y represents the number of the scanning line including six picture elements as stored in the buffer memory 3 while x represents the number of the picture element on the scanning line specified by y. Thus, as the objective area surrounded by the thick lines L1 includes $2 \times 2$ picture elements, the register 34 stores a value of $2b-2$ and the 1/6 dividing counter 31 counts the incoming clock pulses so as to produce values from 0 to 5 so that the adder 33 provides values from $x=2b-2$ to $x=2b+3$. Thus, data points corresponding to the picture elements from $x=2b-2$ to $2b+3$ for the scanning line $y=0$ are sequentialy read out. The dividing counter 31 produces a pulse adding a value of one to the value indicated by the dividing counter 32 after which the counter 31 is reset thereby indicating zero again. Therefore, as when $y=0$, data points corresponding to picture elements from $x=2b-2$ to $x=2b+3$ are read out for the scanning line $y=1$. In a similar manner data points are sequentially read out corresponding to picture elements $x=2b+3$ and $y=5$ after which the counter 32 receives pulses applied from the counter causing its output count to return to zero and also providing a block-read end signal. At this time, the value stored in the register 34 is incremented by two. When a clock pulse counter 31 next receives a pulse, the counter 31 produces a zero output and the data for $x=2b$ to $x=2b+5$ is read out corresponding to the scanning lines $y=0$ to $y=5$.

The read-out data corresponding to the $6 \times 6$ picture elements is supplied through a gate 40 to a counter 41. The other input of the gate 40 receives clock pulses so that the data is supplied to the counter 41 only when a clock pulse is applied to the gate 40. The counter 41 counts the number the data points representing white and couples the result to a discrimination circuit 42. The data supplied to the gate 40 includes the data relating to $2 \times 2$ picture elements in the objective area. However, such data preferrably should be removed from the data stream. For this purpose, an inverter 37 and a gate 39 are provided. The gate 39 selects clock pulse to close the gate 40 when the data on line corresponds to the picture elements in the objective area to thereby prevent such data from reaching the counter 41. To this effect, signal lines $38-1$ and $38-2$, which are in the active state only when the counted value is two or three on the signal lines supplying the output values produced by the counters 31 and 32 and coupled to the adder 33 by the address counter 35, are coupled to the input of the AND gate 36. Thereby, the AND gate 36 is in the active state only when the address counter 35 contains addresses relating to the picture elements in the objective area when the data corresponding to these picture elements is read from the first buffer memory 3. At such times, the output of the inverter 37 assumes a low level to thereby close the gate 39 and prevent the clock pulse C from being supplied to the gate 40. Therefore, the data read at this time is not supplied to the counter 41 and only data points corresponding to the picture elements in the surrounding area (the hatched area in FIG. 5) are counted.

Although the data read in the above manner corresponding to the objective area is not counted by the counter 41, this data is stored in a four-bit shift register 47. That is, when the data is read out, the output of the gate 36 is at a high level as described above and clock pulses C are supplied through gates 43 and 46 to the shift register 47. The shift register 47 shifts the stored data only when a clock pulse is applied thereto while simultaneously receiving the data read-out from the first buffer memory 3. Thus, when the data corresponding to the $6 \times 6$ picture elements is read out, the data corresponding to the $2 \times 2$ picture elements in the objective area is stored in the shift register 47.

At the end of reading the data corresponding to the $6 \times 6$ picture elements, the dividing counter 32 produces a block-read end signal E. The discrimination circuit 42 responds to this signal to effectuate a discriminating operation in accordance with the output value of the counter 41 after which the count value of the counter 41 is returned to zero. The discriminated result is applied to a selector 48 for controlling the selection of its through connection in the following manner. That is, all of the 4 picture elements in the objective area are concluded as being white and the selector 48 is commanded to select the data corresponding to white when the value counted by the counter 41 (the number of white picture elements in the surrounding area) is more than a predetermined level whereas the selector 48 is commanded to select the data coming from the shift register 47 when the value counted by the counter 41 is less than the predetermined level. Alternatively, it is to be noted that all of the picture elements in the objective area may be concluded as being black to cause the selector 48 to select the data corresponding to black when the value counted by the counter 41 is less than the predetermined level. The block-read end signal E generated by the dividing counter 32 serves as a command to a gate signal generator circuit 44. Upon the signal E being applied to the gate signal generator circuit 44, the output of the circuit 44 changes to the high state and the circuit starts to count the clock pulses C. After four pulses have been counted, the output returns to the low state. This in turn causes the gate 45 to supply four clock pulses to a shift register 47, an address counter 49, and a gate 50 after the block-read end signal E is generated. The clock pulses are supplied through the gate 50 to the second buffer memory 4 to enable it for being written into and for generating an address which is coupled to the second buffer memory through the address counter 49. At this time, the shift register 47 couples the data stored therein to the selector 48 each time a clock pulse is applied thereto. Thus, if the selector 48 selects the data from the shift register, the data stored in the shift register which corresponds to the objective data will be transferred to the buffer memory 4 while if the selector 48 selects constant-state data representing either all white or all black, the constant-state data will be written in the buffer memory. As shown in FIG. 4, the constant-state data may be supplied by a ground connected to one input to selector 10. In such a manner, the selected data is written in the second buffer memory 4.

The address counter 49 generates an address for writing the data into the second buffer memory 4. In the case where the objective area includes 2×2 picture elements on scanning lines 2a and 2a+1 and on lines 2b and 2b+1 (where b=1, 2, ..., n−2), the addresses are sequentially generated, one for very four clock pulses. The address generation proceeds in order from b=1 to b=n−2. A signal indicating that the second step for the scanning lines 2a and 2a+1 including the picture elements in the objective area is complete is supplied from the address counter 49 to the control circuit 6 when the address generation sequence is completed. The signal causes the control circuit 6 to cut off the clock pulses C from the noise elimination circuit 5.

Figure 6:
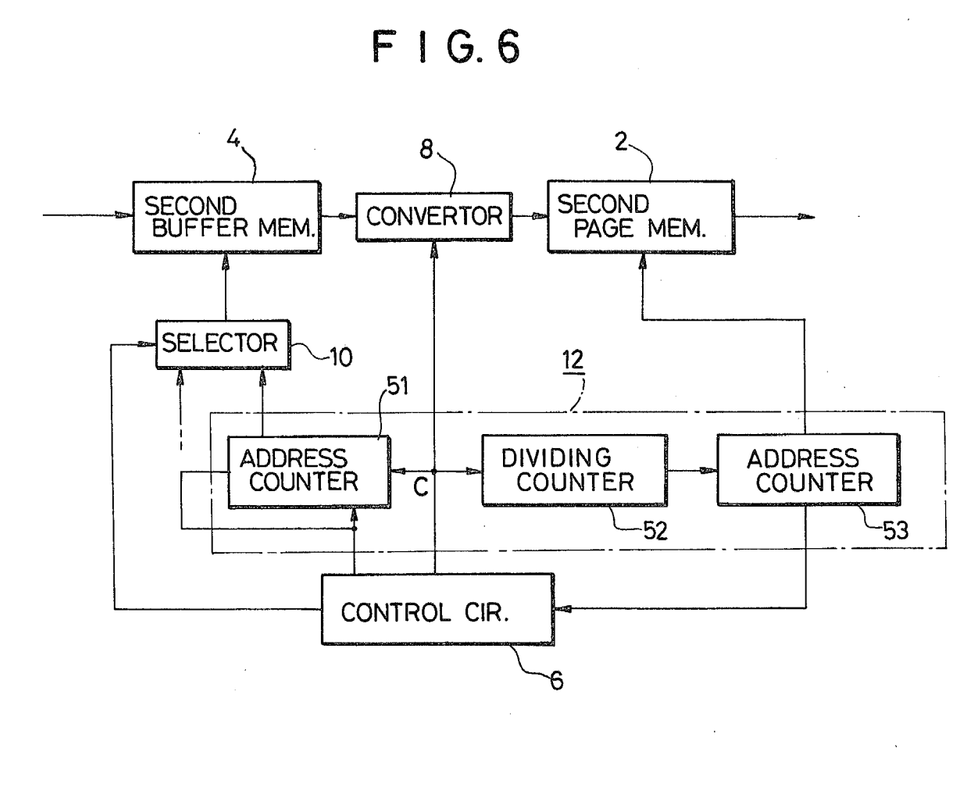

FIG. 6 is a block diagram showing a detailed schematic diagram of the second address defining circuit 12 which includes address counters 51 and 53 and a P dividing counter 52. At the start of the third step, clock pulse C are supplied from the control circuit 6 to the P dividing counter 52 and the series-to-parallel converter circuit 8. The control circuit 6 controls the second selector 10 such that the address counter 51 can define an address which is coupled to the second buffer memory 4. At this time, the second buffer memory 4 is in the read state and the second page memory 2 is in the write state. The address counter 51 responds to the clock pulses C to sequentially generate addresses from 0 to $4n-1$ which are coupled to the second buffer memory 4. The address counter 51 is reset to zero after producing the address $4n-1$. The data read from the second buffer memory 4 is converted to four-bit parallel by the series-to-parallel converter circuit 8 with the resulting data transferred to the second page memory 2. The P dividing counter 52 generates a pulse each time P clock pulses are supplied thereto and the address counter 53 generates an address for every P bits coupled to the second page memory 2 for each pulse received from the P dividing counter 52. In such a manner, the data relating to the scanning lines 2a and 2a+1 stored in the second buffer memory 4 are stored at the address corresponding to the scanning lines stored in the second page memory 2. As described above, when the address counter 51 produces an output address of $4n-1$ and is reset or the data stored in the second buffer memory 4 is completely transferred to the second page memory 2, the control circuit 6 detects that the third step has been completed by the counter 51 and accordingly cuts off clock pulses to the counter 51, the dividing 52, and the series-to-parallel converter circuit 8.

By repeating the first, second and third steps as described above a desired number of times, noise on the electric image signals stored in the first page memory 1 is eliminated and the second page memory 2 stores electric image signals substantially free of noise. Therefore, if the contents stored in the second page memory is read out in a predetermined order, a series of image signals free of noise or having reduced noise components is obtained. A high quality reproduced image is then obtained by reproducing the image signals on a recording paper sheet or displaying them on a CRT in a well-known manner.

As can be seen from the foregoing, the noise elimination system of the present invention can eliminate noise, particularly thin-line or "hair" noise without degrading the overall image information and can process at one time a plurality of (N) picture elements so as to reduce the processing time to 1/N. Since such thin-line or "hair" noise tend to be generated while reproducing a converted image produced by converting an original document image into a series of binary electric signals and then re-ordering the binary electric signals and subsequently recording them as a converted image the noise elimination system of the present invention is particularly effective in reproducing such a converted image.

Although the present invention has been described with an assumption that the data included in the surrounding area is to be used for making a conclusion as to whether the elements in the objective area are black or white, the data included in the objective area and the surrounding area may be used therefor as well. For example, all of the data relating to the area surrounded by thick lines L2 (FIG. 1) including the data in the objective area (2×2 picture elements) surrounded by thick lines L1 (FIG. 1) can be used for such a determination. Although this may cause inferior judgement accuracy and reduced noise elimination, a simpler arrangement is provided by the elimination of the inverter 37 and the gates 39 and 40.

What is claimed is:

1. A method for eliminating noise in a system for recording a visible image on a recording medium in accordance with binary electric image signals produced for each of a plurality of scanning line, comprising the steps of counting one level of two levels of the binary electric image signals corresponding to picture elements in a surrounding area surrounding at least a part of an objective area including at least one picture element and producing an image signal representing the at least one picture element in the objective area as the one level when the percentage of the counted value is more than a predetermined level and as the other level when the percentage of the counted value is less than the predetermined level.

2. The noise eliminating system as set forth in claim 1, wherein the image signal corresponding to the at least one picture element in the objective area is produced corresponding solely to the picture elements in the surrounding area.

3. A noise eliminating system as set forth in claim 1, wherein the binary electric signals corresponding to the picture elements in the surrounding area include the binary electric signal corresponding to the at least one picture element in the objective area.

4. A noise eliminating system as set forth in any of claims 1 to 3, wherein the one value of the image signals corresponds to a white portion of the image.

5. A device for eliminating noise upon recording a visual image upon a recording medium comprising:
   a first memory for storing data representing a visual image comprising data points representing visual components of the image in an objective area and in a surrounding area surrounding said objective area;
   a second memory for storing data from which noise has been eliminated; and
   noise eliminating circuit means for transferring data from said first memory to said second memory, said noise eliminating means comprising means for counting picture elements having a first visual component and means for producing data points representing picture elements in said objective area having said first visual component when the proportion of picture elements in said surrounding area having said first visual component exceeds a predetermined level, said data points produced by said noise eliminating circuit means being stored at positions in said second memory corresponding to picture elements in said objective area.

6. The noise eliminating device of claim 5 wherein said data point producing means comprises means for counting picture elements solely in said surrounding area.

7. The noise eliminating device of claim 5 wherein said data point producing means comprises means for counting picture elements in both said surrounding area and said objective area.

* * * * *